US010592236B2

United States Patent
Krauss

(10) Patent No.: US 10,592,236 B2
(45) Date of Patent: Mar. 17, 2020

(54) DOCUMENTATION FOR VERSION HISTORY

(71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/811,787

(22) Filed: Nov. 14, 2017

(65) Prior Publication Data

US 2019/0146784 A1    May 16, 2019

(51) Int. Cl.
    *G06F 9/44*      (2018.01)
    *G06F 8/73*      (2018.01)
    *G06F 8/71*      (2018.01)

(52) U.S. Cl.
    CPC . *G06F 8/73* (2013.01); *G06F 8/71* (2013.01)

(58) Field of Classification Search
    CPC ... G06F 8/71; G06F 8/73; G06F 17/20; G06F 17/241; G06F 17/30719; G06F 8/34; G06F 17/5054; G06F 2217/02–86; G06N 5/022; G06N 99/005; G06N 5/04
    See application file for complete search history.

(56) References Cited

U.S. PATENT DOCUMENTS

| 7,734,685 | B2 | 6/2010 | Cheng et al. | |
|---|---|---|---|---|
| 8,407,670 | B2 * | 3/2013 | Hegde | G06F 8/71 |
| | | | | 717/122 |
| 8,745,572 | B2 | 6/2014 | Zimmermann et al. | |
| 9,141,378 | B2 * | 9/2015 | Fox | G06F 8/71 |
| 9,588,760 | B1 * | 3/2017 | Bostick | G06F 8/71 |
| 9,600,273 | B2 * | 3/2017 | Neubeck | G06F 8/73 |
| 9,910,837 | B2 * | 3/2018 | Kumarasamy Mani | |
| | | | | G06F 16/164 |
| 10,007,516 | B2 * | 6/2018 | Castelli | G06F 8/73 |
| 10,102,846 | B2 * | 10/2018 | Braz | G10L 15/01 |
| 2004/0015947 | A1 * | 1/2004 | Gong | G06F 8/71 |
| | | | | 717/170 |

(Continued)

OTHER PUBLICATIONS

Greenberg, S, S Voida, N Stehr, and K Tee. "Artifacts as Instant Messaging Buddies". IEEE Proceedings of the 43rd Hawaii International Conference on System Sciences, 2010. pp. 1-10. (Year: 2010).*

(Continued)

*Primary Examiner* — Hiren P Patel
(74) *Attorney, Agent, or Firm* — James L. Olsen

(57) ABSTRACT

Aspects of the present disclosure relate to associating chat history with versions of software development artifacts such as source code files. A version of an artifact is identified. The identified version is analyzed by a natural language processor to determine a set of features associated with the version. The set of features associated with the version is compared to a portion of chat history. Based on the comparison, a match certainty is calculated. In response to the calculated match certainty satisfying a match certainty threshold, a determination is made that the version and the portion of chat history correspond. In response to the determination that the version and portion of chat history correspond, an association between the version and the portion of chat history is stored.

15 Claims, 4 Drawing Sheets

(56) References Cited

U.S. PATENT DOCUMENTS

| | | | |
|---|---|---|---|
| 2013/0074038 A1* | 3/2013 | Fox | G06F 8/71 717/122 |
| 2013/0325977 A1* | 12/2013 | Drews | G06F 16/00 709/206 |
| 2016/0170746 A1* | 6/2016 | Neubeck | G06F 8/73 717/122 |
| 2016/0224337 A1 | 8/2016 | Xia et al. | |
| 2016/0259778 A1* | 9/2016 | Cookson | G06F 17/2785 |
| 2017/0083428 A1 | 3/2017 | Champlin-Scharff et al. | |
| 2017/0185675 A1* | 6/2017 | Arngren | G06F 16/683 |
| 2017/0269930 A1* | 9/2017 | Castelli | G06F 8/73 |

OTHER PUBLICATIONS

Tversky, A. "Features of Similarity." Psychological Review, vol. 84 No. 4, Jul. 1977. pp. 327-352. (Year: 1977).*

Hupfer et al., "Introducing Collaboration into an Application Development Environment," CSCW '04: Proceedings of the 2004 ACM Conference on Computer Supported Cooperative Work, Nov. 2004, pp. 1-4. DOI: 10.1145/1031607.1031611.

Abel, A., "Comments are not Version Control," Coding Abel, posted: Jul. 2, 2012, printed: Aug. 10, 2017, pp. 1-7. https://coding.abel.nu/2012/07/comments-are-not-version-control/.

IBM, "IBM InfoSphere Global Name Management: Developer's Guide," Version 4, Release 1, SC19-2528-00, 222 pages, © Copyright IBM Corp. 2001, 2009.

"IBM InfoSphere Global Name Management," Overview, printed: Aug. 10, 2017, 1 page. https://www.ibm.com/us-en/marketplace/ibm-infosphere-global-name-management.

"Literate Programming—Source Code Comments," literateprogramming.com, printed Aug. 10, 2017, pp. 1-2. http://www.literateprogramming.com/quotes_sc.html.

"Nonwhitespace Language Sentiment Analysis Customization," SAP Help Portal, printed Aug. 10, 2017, pp. 1-2. https://help.sap.com/viewer/650b1af302924b3d85ec109e325edf93/2.0.0.

"What are the programming mistakes most inexperienced programmers make?" Quora, printed: Nov. 10, 2017, pp. 1-13, https://www.quora.com/What-are-the-programming-mistakes-most-inexperienced-programmers-make.

"Subversion," Slack.com, App, pritned Aug. 10, 2017, pp. 1-2. https://slack.com/apps/A0F827LTA-subversion.

"TestComplete 12 Documentation," SMARTBEAR, printed: Aug. 10, 2017, pp. 1-3. http://support.smartbear.com/testcomplete/docs/index.html.

* cited by examiner

DOCUMENTATION FOR VERSION HISTORY

BACKGROUND

The present disclosure relates generally to the field of software coding, and more particularly, to version control.

Source code is a collection of computer instructions designed to facilitate the functions of computer programs. The source code can be converted by an assembler or compiler into a binary form executable by the computer. Artifacts are source code files, graphics files, multimedia files, binary files, and metadata used to build an entire computer program or a component of a computer program. Source code and other artifacts are commonly annotated with comments, which can be used to indicate particular aspects of code lines, or for any other purpose. Version control can be used to track changes made to the source code and other artifacts over time, by storing versions of the source code and other artifacts associated with each revision cycle of a computer program. Each version can be annotated with comments that can specify the changes made to the source code or other artifacts, the purpose of the revision (e.g., the bug being fixed or the enhancement being introduced), the individual modifying the source code or other artifacts, as well as the time and date of the revision.

SUMMARY

Embodiments of the present disclosure relate to associating chat history with versions of source code and other artifacts. A version of an artifact can be identified. The identified version can be analyzed by a natural language processor to determine a set of features associated with the version. The set of features associated with the version can be compared to a portion of chat history. Based on the comparison, a match certainty can be calculated. In response to the calculated match certainty satisfying a match certainty threshold, a determination is made that the version and the portion of chat history correspond. In response to the determination that the version and the portion of chat history correspond, an association between the version and the portion of chat history is stored.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
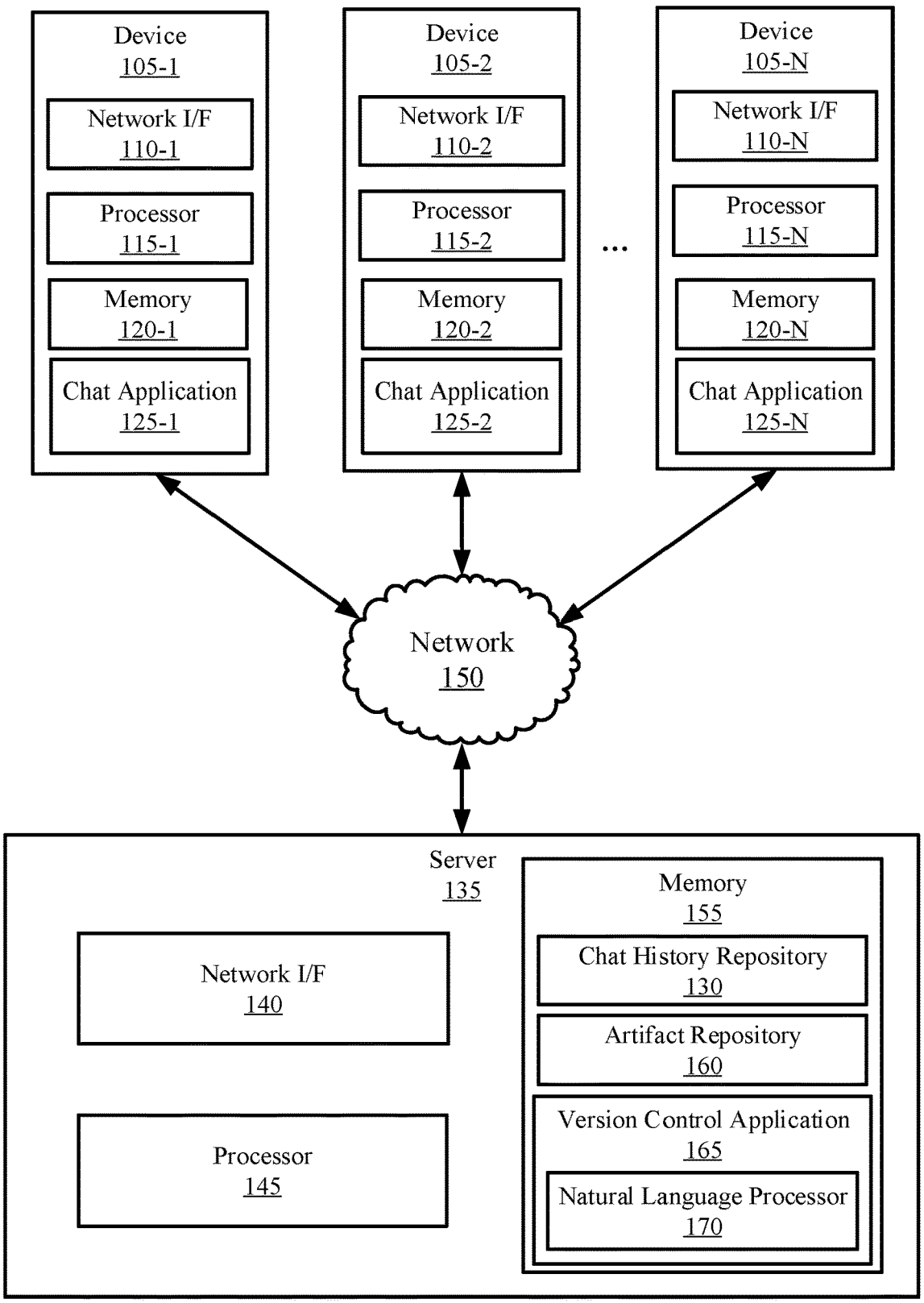
FIG. 1 is a block diagram illustrating an example computing environment in which embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of software development, and more particularly, to version control. While the present disclosure is not necessarily limited to such applications, various aspects of the disclosure may be appreciated through a discussion of various examples using this context.

A common issue facing software development is the lack of dependable comments that programmers can rely on while maintaining the source code for software components, or more broadly, the artifacts used to build the software. Commenting deficiencies occur even though modern version control tools allow documentation of changes to code and other artifacts as these changes are introduced. The programmers often omit informative discussions surrounding introduced changes, and with the passage of time programmers thus face increasing difficulty understanding the reasoning behind earlier versions of code and of other artifacts. This can lead to an increase in the time required to update, merge (e.g., with other source code versions), and/or debug the software.

Aspects of the present disclosure automatically associate artifact revisions (e.g., modifications entered into source code versions) with chat history data. The artifact revisions can be analyzed (e.g., by a natural language processor), and compared to the chat history data (e.g., chat-log discussions of the code between developers). In some embodiments, based on the comparison, a match certainty is calculated between an artifact revision (e.g. a line of source code that has changed) and a portion of chat history data. Based on the match certainty, a determination can be made as to whether to store an association between the revised version of the artifact and the chat history data (e.g., based on a match certainty threshold). The association can be stored in a version control repository with the revised version of the artifact or in a chat history repository with relevant chat data.

By automatically associating versions of artifacts with chat history data, the changes surrounding the artifact versions can be clarified in the context of the conversations developers were having at the time each version was introduced. This can enable a better understanding of the artifacts and their history for developers who may be interested in acquiring information about a particular revision of the artifact, such as a portion of a source code file.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively referred to as devices 105), at least one server 135, and a network 150.

Consistent with various embodiments, the server 135 and the devices 105 are computer systems. The devices 105 and the server 135 include one or more processors 115-1, 115-2 . . . 115-N (collectively referred to as processors 115)

and 145 and one or more memories 120-1, 120-2 . . . 120-N (collectively referred to as memories 120) and 155, respectively. The devices 105 and the server 135 are configured to communicate with each other through internal or external network interfaces 110-1, 110-2 . . . 110-N (collectively referred to as network interfaces 110) and 140. The network interfaces 110 and 140 are, in some embodiments, modems or network interface cards. The devices 105 and/or the server 135 can be equipped with a display or monitor. Additionally, the devices 105 and/or the server 135 include optional input devices (e.g., a keyboard, mouse, scanner, video camera, or other input device), and/or any commercially available or custom software (e.g., browser software, communications software, server software, natural language processing software, search engine and/or web crawling software, filter modules for filtering content based upon predefined parameters, coding software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

The network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed-data processing system that provides one or more cloud computing services. Further, a cloud computing environment can include many computers (e.g., hundreds or thousands of computers or more) disposed within one or more data centers and configured to share resources over the network 150.

The devices 105 include chat applications 125-1, 125-2 . . . 125-N (collectively chat applications 125). The chat applications 125 can be used for communication over the network 150. Specifically, devices 105 and/or server 135 can transmit messages, images, videos, or other data through the chat applications 125 over the network 150. The transmitted content (e.g., chat history data) can be stored in a chat history repository 130 on the server 135. In some embodiments, the chat history data is stored on chat applications 125 of the devices 105. Because the chat applications 125 enable collaboration between users across devices 105, the chat history data can include communication between developers regarding artifact revisions. For example, the chat history data stored in the chat history data repository 130 can include user-indicated, time-stamped message chains (e.g., chat logs) regarding recent source code updates, tests, bugs, and the like.

The server 135 includes a version control application 165. The version control application 165 can be configured to associate chat history data corresponding to updated versions of the artifact, or vice versa (e.g., associate source code versions with chat history data). Users accessing devices 105 can make updates to artifacts (e.g., source code revisions) which are stored in an artifact repository 160 on the server 135 (e.g., over the network 150). The artifact repository 160 can store version history, version comments, bug tracking information, release history (e.g., the testing and improvements corresponding to source code version releases), and the like. The data stored in the chat history repository 130 can be analyzed by the version control application 165 to automatically associate data included in the chat history repository 130 with data stored in the artifact repository 160. Alternatively, the data stored in the artifact repository 160 can be analyzed by the version control application 165 to automatically associate the artifact data with the data stored in the chat history repository 130. In yet another alternative, a separate program or component can analyze the data stored in the chat history repository 130 and can compare it, either with data stored in the artifact repository 160 or with data inbound to the artifact repository 160 from the version control application 165, to automatically associate the artifact data with the data stored in the chat history repository 130.

Accordingly, either the chat history data can be analyzed and associated with the artifact data, or the artifact data can be analyzed and associated with the chat history data (e.g., the analyzation order can vary), in either case via functionality implemented within the version control application 165, the chat applications 125, a separate program or component, or any combination of these. In embodiments, a programmer can work with either the version control application 165, at least one of the chat applications 125, or both, via an Integrated Development Environment (IDE). An IDE provides a variety of software development facilities to the programmer. In embodiments, a programmer using the IDE can work with a program or component that can automatically associate artifact data stored in the artifact repository 160 with the chat history data stored in the chat history repository 130, in accordance with the inventive arrangements disclosed herein, which can be made available in the IDE via an IDE extension, via a Software Development Kit (SDK), or via similar means known to those of skill in the art. An SDK, for example, is a set of software development tools and interfaces that enables software implementations for a specific platform such as an IDE. An SDK may be available for the IDE, thus allowing a wide range of software development tools to integrate and interact with one another via the IDE. In embodiments, the association between chat history data and artifact data can be arranged via the IDE, for example via an IDE extension that has access to the chat history data and artifact data, via one or more of the version control application 165 and the chat applications 125 as they are accessed via the IDE, or via a separate program or component that is accessible via the IDE and that has access to the chat history data and artifact data.

As an example illustrating how the analyzation order can vary in embodiments, if the chat history repository 130 includes a chat log regarding a particular bug fix in a version of a file included in the artifact repository 160, the version control application 165 can be configured to analyze the chat log regarding the particular bug fix and associate it with the portion of source code that fixed the bug. Alternatively, following the example above, the version control application 165 could instead analyze the artifact version with the bug fix and associate the portion of source code containing the bug fix with the chat log data in the chat history repository 130. The associations between the chat history repository 130 and the artifact repository 160 (collectively repositories) can be stored as metadata within one or both of the repositories. For example, in some embodiments, a hyperlink can be stored in both the chat history data repository 130 and artifact repository 160, to enable redirection to relevant portions in each repository (e.g., by activating the hyperlink). Accordingly, users accessing the chat history repository 130 can activate (e.g., "click") the hyperlink to be redirected to the code lines relevant to the revision discussion. Further, users accessing source code versions in the artifact repository 160 can activate the hyperlink to be redirected to the relevant content in the chat history repository 130.

In some embodiments, the portion of chat history identified as relevant to a particular artifact version can be extracted from the chat history repository 130 and stored as metadata in the artifact repository 160. The identified portion of chat history can be stored, for example in association with the associated source code lines, in the artifact repository 160. As such, even if the data stored in the chat history repository 130 is erased, the relevant chat content can be located in the artifact repository 160.

In order to analyze the data stored in the chat history repository 130 and artifact repository 160, the version control application 165 includes a natural language processor 170. The natural language processor 170 can be configured to extract, parse, analyze, and process the data stored in these repositories. For example, the natural language processor 170 can be configured to structure data (e.g., convert data into plaintext) in the repositories, and complete various analyses (e.g., semantic analysis, lexical analysis, part of speech (POS) tagging, syntactic analysis, personal name recognition, etc.) of the structured data. In some embodiments, the natural language processor 170 processes the structured data into a form convenient for comparison to other processed data (e.g., formats the data in a particular manner). This enables the version control application 165 to compare various features (e.g., timings, programmer names, code function or procedure names, variable names, file names, keywords, product names, code line identifiers or tags, etc.) between the chat history repository 130 and artifact repository 160.

In some embodiments, user names (e.g., developer logins, legal names, aliases, etc.) can be analyzed in order to associate data included in the chat history repository 130 with data included in the artifact repository 160. For example, if a user, "Jaime," checks-in a particular source code revision which is stored in the artifact repository, the username "Jaime" can be cross-referenced in order to locate corresponding chat history (e.g., included in the chat history repository 130) by Jaime which may be relevant to the code revision. In some embodiments, groups of user names can be cross-referenced between the chat history repository 130 and the artifact repository 160 (e.g., all the developer's usernames associated with a revision can be cross-referenced in the chat log). In some embodiments, the cross-referencing can be performed by, or with the aid of, a personal name recognition facility or similar software that performs fuzzy matching of personal names.

In some embodiments, timings (e.g., times and dates) can be analyzed in order to associate data included in the chat history repository 130 with data included in the artifact repository 160. For example, if a particular code revision was checked into the artifact repository 160 at 11:00 AM on Oct. 18, 2017, then the version control application 165 can search corresponding timeframes in the chat history repository 130 in order to associate relevant chat data. In this example, the version control application 165 can be configured to parse chat data within a particular timeframe (e.g., within the day, week, month, etc.) prior to the check-in, for association purposes.

Features which can be compared between the artifact versions and chat history data include, but are not limited to, timings and names. Names that can be compared include, but are not limited to, artifact names, version identifiers, personal names, or names or groups of names associated with code lines, code modules, functions, methods, procedures, software products, variables, constants, graphical images, icons, data streams, data structures, objects, object classes, class libraries, files, directories, computers, networks, storage devices, tests, results, text strings, titles, section headings, and/or references to or content in product manuals, other documentation, or multimedia tracks or clips. By analyzing various features of the artifact repository 160, more confident associations to the chat history repository 130 can be generated. For example, the features to be compared can include simply a name and a timing, such that the portion of the chat history to be compared with the features can be selected based on the timing, and the comparison can include matching the name included in the features to a name that appears in that selected portion of chat history. For improved confidence, combinations of features (e.g., groups of usernames, personal names, peers, functions, and version identifiers) can be simultaneously considered to associate portions of chat history data with artifact version data. That is, considering multiple features simultaneously can improve the association quality (e.g., match certainty) between the chat log and the artifact versions.

In some embodiments, the comparisons between the chat history data and the artifact data features can be analyzed (e.g., statistically) in order to determine whether the associations should be stored. For example, in some embodiments, the associations are only stored based on a certain degree of match certainty (e.g., if the match certainty exceeds a predetermined match certainty threshold). The degree of match certainty can be based on the number of matches between the features (e.g., matching function name, user name, time, etc.) and/or the exactness of the matches (e.g., the number of matching characters and/or order of characters). For example, where the matching features between a source code revision and chat history data include a user group (e.g., team of developers), function, timing, and revision number the association can be determined to have a high degree of match certainty. As another example, where chat content includes terms precisely or closely matching the name of a function modified shortly after the time of that chat, and the name is not found in a dictionary of commonly used (i.e., common dictionary or vernacular) terms, then the association can be determined to have a high degree of match certainty. Conversely, if the timing is the only matching feature between the source code revision and the chat history, the association can be determined to have a low degree of match certainty.

Through reference is made to analysis by a natural language processor 170, in some embodiments, analysis by the natural language processor 170 is not required. In these embodiments, particular segments of chat data can be indicated to be associated with particular segments of source code or other artifact data by a user or another application. For example, if a user is checking-in a particular revision in the artifact repository 160, then the user can highlight the relevant chat data in the chat history repository 130 and manually associate the chat data with relevant source code data.

The association between the chat history repository 130 and the artifact repository 160 can be completed at any time. In some embodiments, the association is completed at the time revisions are checked-in to the artifact repository 160. By associating the chat history and the revisions at the check-in time, the likelihood the chat data is erased prior to the association can be reduced. This can be beneficial when chat data is stored as metadata in the artifact repository 160, as it can be stored prior to a clearing or deletion of chat data. In some embodiments, the associations are generated periodically (e.g., after a pre-determined amount of time). In some embodiments, the associations are generated based on a threshold (e.g., a number of code-line modifications exceeds a pre-determined threshold), predefined rule, identified match, or any other criteria.

In some embodiments, based on the natural language processor 170 analysis, data included in either repository (e.g., the chat history repository 130 or artifact repository 160) can be disregarded as irrelevant information for association purposes. For example, if a collaboration in the chat history discusses not only a particular source code revision, but also lunch plans for the afternoon, then the version control application 165 can be configured to disregard the lunch plans during association. In embodiments where chat history data is extracted from the chat history repository 130 and stored as metadata with the relevant revision in the artifact repository 160, the version control application 165 can be configured to extract only the chat history relevant to the revision for storage in the artifact repository 160 (e.g., the lunch plans are omitted and not stored in the artifact repository 160). In some embodiments, portions of the chat history which decrease the match certainty (e.g., are not relevant to the source code revision) can automatically be disregarded from the association (e.g. by selectively extracting the content with the highest degree of match certainty, to form an association that incorporates or references more than one selection from a portion of the chat history).

In some embodiments, the version control application 165 can utilize difference algorithms or equations (e.g., equations which map the changes from one version of source code to the next) to identify revisions made to the source code. The identified revisions can then be analyzed to identify relevant chat history portions which can be mapped thereto. Versions can be compared, and changes in artifacts identified, by means of a difference algorithm, such as the Myers diff algorithm. Various algorithms may be applied to artifacts of various types to identify changes between versions, for analysis via such various natural language processing techniques as may apply to chat history portions of relevance to the artifacts.

Though specific reference is made to associating chat history with source code revisions, any other data included in the artifact repository 160 can be associated with the chat history. For example, testing and release history data stored in the artifact repository 160 can be associated with relevant chat portions in the chat history repository 130 via analysis by the version control application 165.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet). Further, in some embodiments, the source code repository 160 and/or chat history repository 130 can be stored across a plurality of servers and/or devices.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, in some embodiments, the server 135 includes a chat application (e.g., chat applications 125). In some embodiments, the components of the system (e.g., the chat applications 125, chat history repository 130, artifact repository 160, version control application 165, and natural language processor 170) can all be centrally located on a single application. For example, in some embodiments, the components of the system can all be included in or accessed via an integrated development environment (IDE). However, the configuration of the system can vary, and the invention is not limited to any particular arrangement described.

Figure 2:
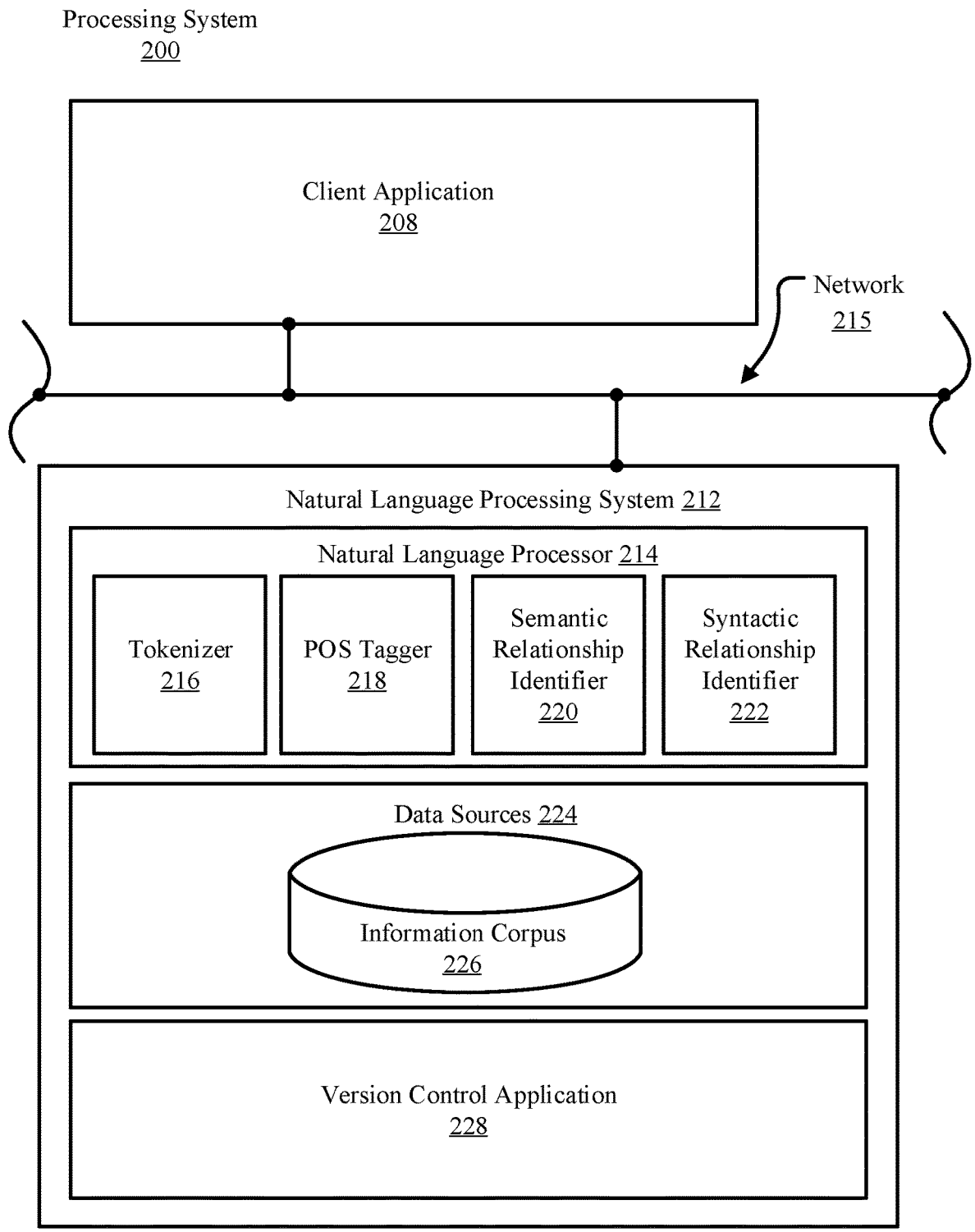
FIG. 2 is a block diagram illustrating a natural language processing system configured to process unstructured data inputs, in accordance with embodiments of the present disclosure.

Turning now to FIG. 2, illustrated is a block diagram of an example natural language processing system 200 configured to process unstructured data inputs (e.g., unstructured text documents), in accordance with embodiments of the present disclosure. In some embodiments, a remote device (e.g., device 105-1 of FIG. 1) can submit input data to be analyzed by the natural language processing system 212, which can be a standalone device, or part of a larger computer system. Such a processing system 200 can include a client application 208, which can itself involve one or more entities operable to generate or modify unstructured input data that is then dispatched to a natural language processing system 212 via a network 215.

Consistent with various embodiments, the natural language processing system 212 can respond to electronic document submissions sent by the client application 208 (e.g., chat applications 125 of FIG. 1). Specifically, the natural language processing system 212 can analyze a received unstructured data input (e.g., chat logs included in the chat history repository 130 or source code included in the artifact repository 160 of FIG. 1) and prepare the unstructured data input for comparison to other data. The natural language processing system 212 includes a natural language processor 214, data sources 224, and a version control application 228.

The natural language processor 214 (e.g., natural language processor 170 of FIG. 1) can be a computer module that analyzes the received unstructured input data from data sources 224. The data sources 224 can be the same or substantially similar to the chat history repository 130 and artifact repository 160 described in FIG. 1. In some embodiments, the data sources 224 can include an information corpus 226. The information corpus 226 can enable data storage and retrieval. In some embodiments, the information corpus 226 may be a storage mechanism that houses a standardized, consistent, clean, and integrated list of data, such as chat history data and/or version control history data that has been arranged subject to data quality or data hygiene systems or rules.

The natural language processor 214 can perform various methods and techniques for analyzing electronic documents (e.g., syntactic analysis, semantic analysis, personal name recognition, etc.). The natural language processor 214 can be configured to recognize and analyze any number of natural languages. In some embodiments, the natural language processor 214 can parse passages of the documents (e.g., chat logs and/or source code files). Further, the natural language processor 214 can include various modules to perform analyses of electronic documents. These modules can include, but are not limited to, a tokenizer 216, a part-of-speech (POS) tagger 218, a semantic relationship identifier 220, and a syntactic relationship identifier 222.

In some embodiments, the tokenizer 216 can be a computer module that performs lexical analysis. The tokenizer 216 can convert a sequence of characters into a sequence of tokens. A token can be a string of characters included in an electronic input document and categorized as a meaningful symbol. Further, in some embodiments, the tokenizer 216 can identify word boundaries in an electronic document and can break any text passages within the document into their component text elements, such as words, multiword tokens, numbers, and punctuation marks. In some embodiments, the tokenizer 216 can receive a string of characters, identify the lexemes in the string, and categorize them into tokens.

Consistent with various embodiments, the POS tagger 218 can be a computer module that marks up a word in passages to correspond to a particular part of speech. The POS tagger 218 can ingest a passage or other text in natural language and assign a part of speech to each word or other token. The POS tagger 218 can determine the part of speech to which a word (or other text element) corresponds, based on the definition of the word and the context of the word. The context of a word can be based on its relationship with adjacent and related words in a phrase, sentence, or paragraph. In some embodiments, the context of a word can be dependent on one or more previously analyzed data inputs (e.g., the context of a word in a dictionary can describe or bring further meaning to a word or phrase in an encyclopedia). In embodiments, the output of the natural language processing system 212 can populate a text index, a triple-store, or a relational database (RDB) to enhance the contextual interpretation of a word or term. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, the POS tagger 218 can tag or otherwise annotate tokens of a passage with part of speech categories. In some embodiments, the POS tagger 218 can tag tokens or words of a passage to be parsed by the natural language processing system 212.

In some embodiments, the semantic relationship identifier 220 can be a computer module that can be configured to identify semantic relationships of recognized text elements (e.g., words, phrases) in documents. In some embodiments, the semantic relationship identifier 220 can determine functional dependencies between entities and other semantic relationships.

Consistent with various embodiments, the syntactic relationship identifier 222 can be a computer module that can be configured to identify syntactic relationships in a passage composed of tokens. The syntactic relationship identifier 222 can determine the grammatical structure of sentences such as, for example, which groups of words are associated as phrases and which word is the subject or object of a verb. The syntactic relationship identifier 222 can conform to formal grammar.

In some embodiments, the natural language processor 214 can include a personal name recognition component that can search, analyze, and compare multicultural name data sets by applying culture-specific name data and linguistic rules that are associated with the name's culture. The name recognition component can ingest tokenized text data or recognized text elements, can recognize potential personal names and parse them into surname and given name components, and can generate variations of personal names, including common or user-suggested nicknames, for comparison. The name recognition component can match names based on both pronunciation and orthography, associating the closeness of the matches with scores. Thus the name recognition component can compare monikers or other identifiers associated with users of the version control application 228 with personal names that appear in the chat history, for fuzzy personal name comparison.

In some embodiments, the natural language processor 214 can be a computer module that can parse a document and generate corresponding data structures for one or more portions of the document. For example, in response to receiving an unstructured textual report at the natural language processing system 212, the natural language processor 214 can output parsed text elements from the report as data structures. In some embodiments, a parsed text element can be represented in the form of a parse tree or other graph structure. To generate the parsed text element, the natural language processor 214 can trigger computer modules 216-222.

The output of natural language processor 214 can be used to associate chat history data with source code files via the version control application 228. For example, if a source code file is processed by the natural language processing system 212, the processed source code file can be compared to chat history data (e.g., which may also be processed by the natural language processor 214) by the version control application 228. This can allow matching (e.g., fuzzy name matching) between the source code files and the chat history. The comparison can include comparing characters, tokens, semantic relationships, and syntactic relationships between the processed data. The comparison can accommodate conventions used in the software development community, such as the camel-casing of compound names of functions, variables, and the like in lieu of incorporating spaces in the names. The comparison can consider camel-cased names comprising compounded multiple terms as equivalent, or approximately equivalent, to the multiple terms themselves, or to a phrase comprising the multiple terms. Based on the comparison, a statistical analyzer of the version control application 228 can determine a match certainty. The match certainty can depend on the number of "hits" for characters, parts of speech, tokens, identified relationships, features (e.g., timings, user names, product names, code functions, methods, objects, object classes, or any other data included in source code files) and the like between the chat history data and source code revision data. In some embodiments, the match certainty can be quantified by a numerical range (e.g., 1-10) or percentage (e.g., 0-100%) or probability (e.g. 0.01-0.99) or other score. In these embodiments, storing the association between the chat history and the source code data may be completed in response to the match certainty satisfying a predetermined threshold. For example, if a match certainty threshold is defined as 70%, the association is stored only if the match certainty satisfies the 70% threshold (e.g., equal to or exceeding 70% match certainty). In some embodiments, a user can indicate portions of chat history and/or source code to be analyzed by the natural language processor 214, to narrow the amount of data processed by the natural language processor 214.

In some embodiments, the portions of chat history and/or artifact to be analyzed can be determined based on the time elapsed between check-in of artifacts, or between the time associated with particular chat content and the time associated with a particular check-in, beyond which the chat content may not be considered potentially related to the check-in.

Figure 3:
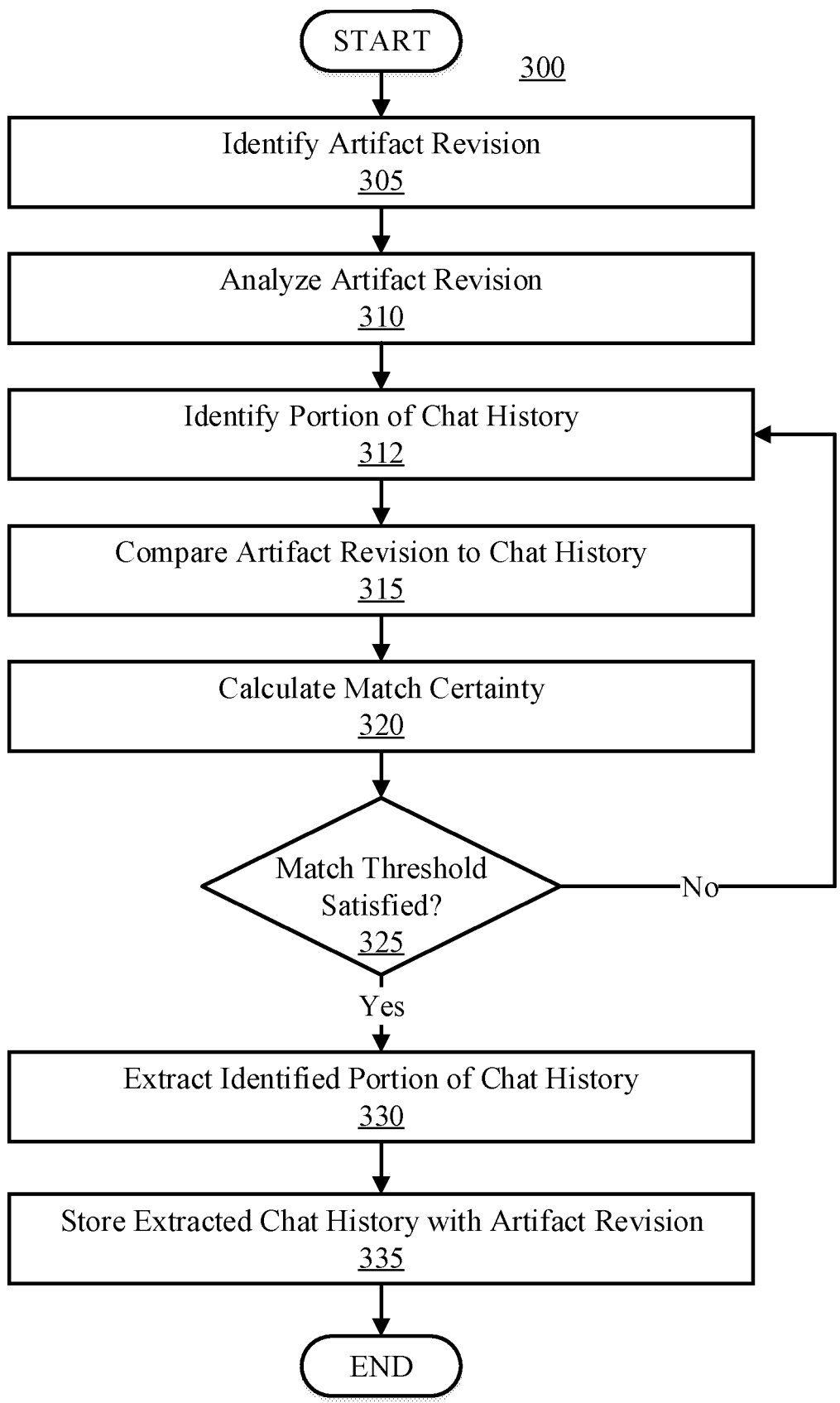
FIG. 3 is a flow diagram of an example method for associating an artifact revision with a portion of chat history, in accordance with embodiments of the present disclosure.

FIG. 3 is a flow diagram illustrating an example process 300 for associating chat history data with an artifact revision (e.g., a committed source code modification in a version of a source code file), in accordance with embodiments of the present disclosure. Process 300 begins at step 305, where an artifact revision is identified. The artifact revision can be identified in any manner. In some embodiments, the artifact revision is identified automatically after it is checked-in, submitted, or otherwise introduced by a developer. In some embodiments, the artifact revision is identified via a difference algorithm or equation (e.g., an equation that maps the differences between two versions of source code). In these embodiments, the revisions can be identified as differences between two versions of a source code file or other artifact stored in a repository. In some embodiments, a revision is identified as indicated or tagged by a user. For example, in some embodiments, the user manually initiates the association process by requesting more information regarding a source code change. In these embodiments, the system may automatically retrieve the relevant chat history in response to a user request.

In any case, the artifact revision is then analyzed. This is illustrated at step 310, in which a version of a source code file is analyzed by a version control system or application (e.g., version control application 165 of FIG. 1). The version control application can include a natural language processor (e.g., natural language processor 170 or 214) to extract, analyze, and process relevant text regarding the source code file version. Analysis at step 310 can include the various analyses described with respect to FIG. 2, including semantic analysis, lexical analysis, POS tagging, tokenization, syntactic analysis, personal name recognition, and the like. The analysis can indicate features of the artifact revision, including timings, developers, function names, code lines, titles, objects, object classes, etc. In some embodiments, analysis at step 310 can structure the artifact revision data into a format (e.g., plaintext) for convenient comparison to other data (e.g., structured chat history data).

A portion of chat history is then identified. This is illustrated at step 312, in which chat history is scanned, and a portion of chat history is identified for comparison with the artifact revision that has been analyzed. The identified portion of chat history is then compared with the analyzed source code file version at step 315. Comparison at step 315 can include comparing the analyzed and/or processed source code revision data to the chat log history. In some embodiments, the chat history data can first be processed by a natural language processor to enable comparison between the chat history data and the source code revision (e.g., by converting both the source code revision data and the chat history data into plaintext or another standard form for comparison).

In some embodiments, the comparison can include comparing features (e.g., functions, code lines, timings, user identities or names, etc.) identified during step 310. For example, the version control application can compare a first timing of the source code revision to a second timing (e.g., which may be the same timing as the first timing) in chat history at step 315. The comparison can include comparing parts of speech, semantical features, tokens, or any other data output by the natural language processor. In some embodiments, comparison at step 315 includes a plaintext comparison, to identify matching characters, phrases, code lines, words, etc. between the chat history data and the source code revision data.

Based on the comparison, a match certainty is calculated between the artifact revision and the identified chat history data. This is illustrated at step 320, in which the match certainty can be calculated based on the similarities between the artifact revision and the identified portion of chat history. In some embodiments, the match certainty is calculated as a numerical value or percentage. In some embodiments, the match certainty is based on a number of matching elements (e.g., words, phrases, or features) between the source code revision and the chat history data.

In some embodiments, the match certainty is based on a comparison of features between the artifact revision and the identified chat history data. For example, if the analysis at step 310 indicates four features (e.g., a user group, timing, function, and object) included in the analyzed source code revision, the match certainty can be calculated based on the number of matching features located in the referenced chat history data. In this example, if the identified chat history data includes a matching user group, timing, and function, the match certainty can be calculated as ¾, or 75%, based on the three matching features. In some embodiments, the frequency of feature occurrences or returns can be considered in the match certainty analysis. For example, if a function identified in the source code revision is identified in five instances of the chat history log, the match certainty can reflect the five appearances of the function (e.g., which may yield a higher match certainty).

The match certainty calculation can consider relative differences (e.g., time differences, character variances, aliases, synonyms etc.) between compared features. For example, if a timing of the artifact revision of FIG. 3 is compared to a timing in the chat history, a time difference (e.g., hours, days, weeks, months, etc.) can be considered when calculating the match certainty. A smaller time difference between the source code revision and the identified chat history data can yield a higher match certainty. Further, though a particular feature in the source code revision may not be an exact word match to a corresponding feature in the identified chat history data, synonyms, aliases or character variances can be considered. For example, if a code function "quadrature method" is identified in the source code revision, and is compared to "quadrature process" in the chat history, the system can be configured to determine that "method" and "process" are synonyms. In this example, the match certainty can be higher if "method" and "process" are determined to be synonyms. As another example, if developer "Lugosi" is indicated in the source code revision, and is compared to Lugosi's nickname, such as "Gosi", in the identified chat history data, the system can be configured to automatically associate the nickname or other personal name aliases such that a feature match is indicated when calculating the match certainty.

In some embodiments, the match certainty can be based on a certain number of matching characters, words, or phrases between the artifact revision and the identified chat history data. In these embodiments, the match certainty can be directly proportional to the number of matching characters, words, or phrases between the artifact revision and the identified chat history data.

After the match certainty is calculated, a determination is then made as to whether the calculated match certainty satisfies a predetermined match certainty threshold. This is illustrated at step 320. The predetermined match certainty threshold can be defined in a configurable manner, based on the comparison algorithms used and/or observed associations being stored. A lower match certainty threshold (e.g., 30%) can lead to a higher number of associations stored between the artifact revisions and the identified chat history data, while a higher match certainty threshold (e.g., 80%) can lead to a fewer number of associations stored. The calculated match certainty is compared to the predetermined match certainty threshold, and if the calculated match certainty satisfies (e.g., is equal to or exceeds) the predetermined match threshold, a determination is made to store the association between the artifact revision and the identified chat history data (e.g., as illustrated in steps 330 and 335).

If the calculated match certainty does not satisfy (e.g., falls below) the predetermined match certainty threshold, process 300 moves back to step 312, where a new portion of chat history is identified. If no further relevant chat history data is available (e.g. no further history is found within the week of the check-in of the source code revision under analysis), then process 300 ends. In some embodiments, however, if the calculated match certainty does not satisfy the predetermined match certainty threshold, process 300 can move back to step 310, where the same source code revision is re-analyzed (e.g., if the natural language processing was not sufficient to render a suitable match). Alternatively, in some embodiments if the calculated match certainty does not satisfy the predetermined match certainty threshold process 300 moves back to step 315, where the source code revision and the identified chat history data are re-compared (e.g., to compare the data in a different manner). Further, in some embodiments if the calculated match certainty does not satisfy the predetermined match certainty threshold, process 300 can instead move back to step 320, where the match certainty is re-calculated (e.g., to use a different algorithm to calculate the match certainty).

If the calculated match certainty satisfies (e.g., is equal to or exceeds) the predetermined match threshold, a determination is made to store the association between the artifact revision and the identified chat history data (e.g., as illustrated in steps 330 and 335). Steps 330 and 335 include storing the relevant identified chat history data as metadata with the source code revision data (e.g., in an artifact repository). At step 330, the relevant identified chat history data (e.g., the portion of chat history data that is associated with the source code revision) is extracted. In some embodiments, the relevant identified chat history data is extracted from a chat history repository (e.g., chat history repository 130 of FIG. 1) where the chat history data is stored. During extraction, data included in the chat history which is not relevant to the source code revision can automatically be pruned. This can ensure that the chat history data stored as metadata with the source code revision does not include extraneous information. Determining extraneous information can be based on the comparison completed at step 315 (e.g., by determining particular portions of the identified chat history data which have no connection to the source code revision).

The extracted chat history data is then stored with the artifact revision. This is illustrated at step 335, in which the extracted chat history data can be stored in a source code repository which includes source code file versions representing code revisions over time. Specifically, the extracted chat history data can be stored as metadata associated with (e.g., adjacent to, proximate to, in the same file as) the revised source code. This can allow the developer to conveniently access the chat history data when inspecting the source code revision.

Though storing the association as depicted in FIG. 3 includes extracting and storing the relevant portion of chat history with the source code revision, storing the association can be completed in any other suitable manner. For example, in some embodiments, the association is stored as a hyperlink with both the portion of chat history and the source code files. In some embodiments, the association is stored as an indication which includes a reference to the corresponding data (e.g., "See Source Code File A, Version 8, Lines 20-40", or a hyperlink leading to the same). In embodiments, any other suitable association between an artifact revision and the extracted chat history data can be stored, either in the artifact repository 160, in the chat history repository 130, or in a database, data structure, or file resident on server 135, on another server, or on a network-accessible or cloud-based storage device.

The association can be displayed on a graphical user interface (GUI) adjacent to the location (e.g., code lines) of the revised artifact (e.g. source code file). In embodiments, the extracted chat history can be displayed within a box (e.g., or other boundary perimeter) proximate to the artifact revision (e.g. source code with highlighted changes). In some embodiments, the association can include storing contact information (e.g., email addresses, phone numbers, user names, locations, etc.) of the developer(s) who implemented the revision. In these embodiments, the contact information can be accessed by a hyperlink or the like. This can allow a developer who studies the revision history at a later time to get into contact with the developer(s) who implemented the revisions to request more information. In some embodiments, the stored association can be modified by the natural language processor to format the language for readability (e.g., to simplify the language, convert the language into another language, etc.).

Embodiments can provide a GUI window, form, dialog, or the like, via which a user can choose and edit portions of chat content that have been automatically selected in accordance with the inventive arrangements disclosed herein, such as the extracted chat history data described with reference to FIG. 3. Embodiments can allow the user to extend the selection of chat content, such that the selection can include content that is not part of the automatically selected content. Embodiments can allow the user to include, exclude, or edit one or more portions of the selection to be associated with a version of an artifact. Embodiments can allow the user to edit chat content before, during, or after storing the association.

Figure 4:
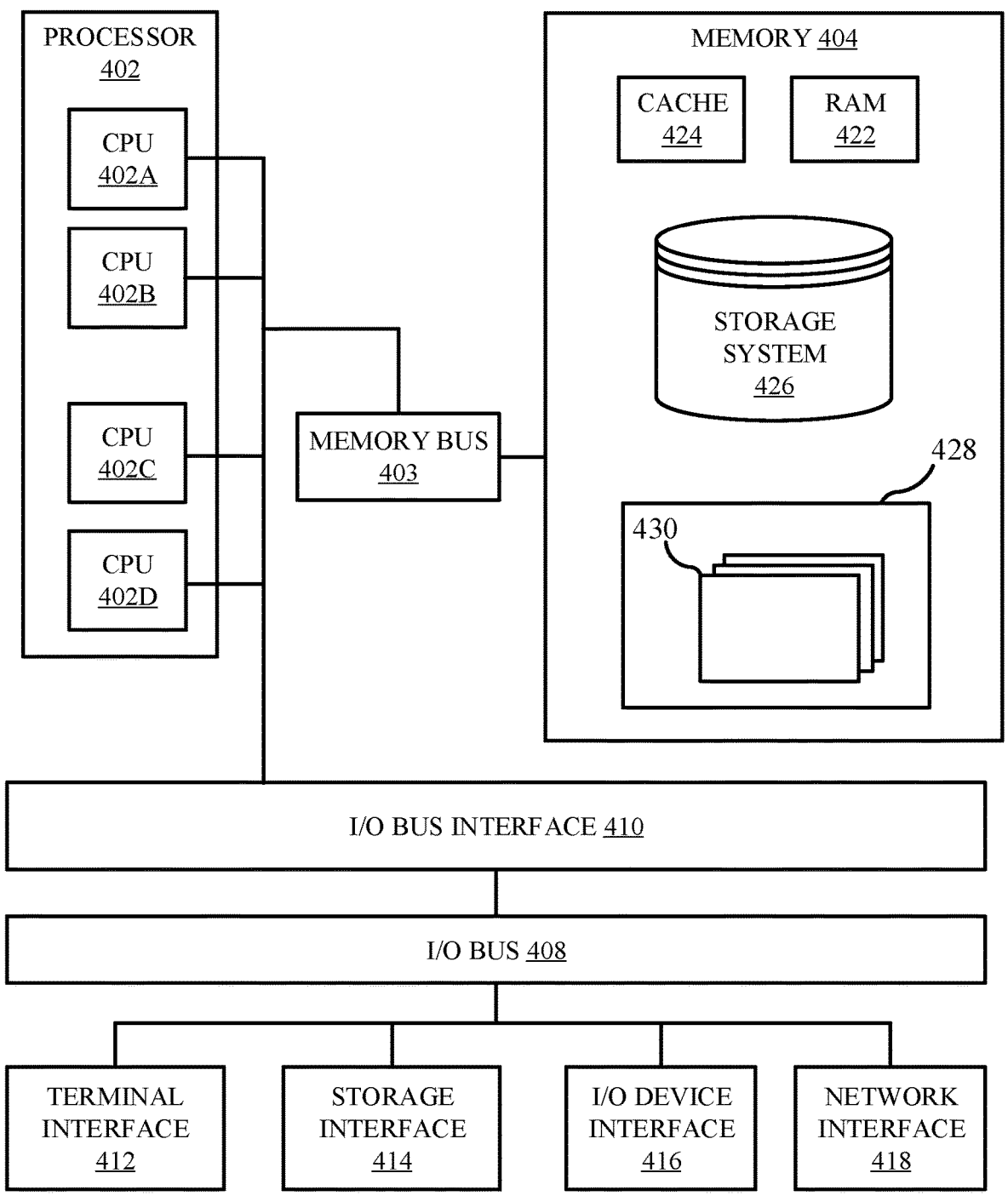
FIG. 4 is a high-level block diagram illustrating an example computer system that can be used in implementing one or more of the methods, tools, and modules, and any related functions, described herein, in accordance with embodiments of the present disclosure.

Referring now to FIG. 4, shown is a high-level block diagram of an example computer system 401 (e.g., devices 105, server 135, and natural language processing system 212) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

In some embodiments, the program modules 430 of the computer system 401 include a version control module. The version control module can be configured associate source code data with chat history data. For example, the version control module can include computer instructions to analyze source code data and chat history data, compare the source code data to the chat history data, and determine whether the source code data should be associated with the chat history data. Based on a determination that the source code data should be associated with the chat history data, an association between the source code data and chat history data is stored.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising;
a memory; and
a processor, wherein the processor is configured to perform a method comprising:
identifying a version of an artifact;
analyzing, by a natural language processor, the version of the artifact, wherein analyzing the version of the artifact comprises:
determining a set of features associated with the version of the artifact;
comparing the set of features associated with the version of the artifact to a portion of chat history;
calculating a match certainty based on a number of matching features between the set of features associated with the version of the artifact and the portion of chat history divided by a total number of features of the set of features associated with the version of the artifact;
determining, in response to the calculated match certainty satisfying a match certainty threshold, that the version of the artifact and portion of chat history correspond; and
storing, in response to the determination that the version of the artifact corresponds to the portion of chat history, an association between the version of the artifact and the portion of chat history, wherein the association is stored as a hyperlink in a repository containing the version of the artifact, wherein activation of the hyperlink redirects a user to the portion of chat history.

2. The system of claim 1, wherein the association is stored in a chat history repository containing the portion of chat history.

3. The system of claim 1, wherein storing the association further comprises:
extracting the portion of chat history from a chat history repository containing the portion of chat history; and
storing the portion of chat history with the version of the artifact in the repository.

4. The system of claim 1, wherein the version of the artifact is identified when a revision of the artifact is introduced into the repository.

5. The system of claim 1, wherein the association is stored when a revision is made to the version of the artifact.

6. The system of claim 1, wherein the method performed by the processor further comprises:
determining an irrelevant portion of data within the portion of chat history; and
storing the portion of chat history without the irrelevant portion of data within the repository containing the version of the artifact.

7. A method comprising:
identifying a version of an artifact;
analyzing, by a natural language processor, the version of the artifact, wherein analyzing the version of the artifact comprises:
determining a set of features associated with the version of the artifact;
comparing the set of features associated with the version of the artifact to a portion of chat history;
calculating a match certainty based on a number of matching features between the set of features associated with the version of the artifact and the portion of chat history divided by a total number of features of the set of features associated with the version of the artifact;
determining, in response to the calculated match certainty satisfying a match certainty threshold, that the version of the artifact and portion of chat history correspond; and
storing, in response to the determination that the version of the artifact corresponds to the portion of chat history, an association between the version of the artifact and the portion of chat history, wherein the association is stored as a hyperlink in a repository containing the version of the artifact, wherein activation of the hyperlink redirects a user to the portion of chat history.

8. The method of claim 7, wherein the association is stored in a repository containing the version of the artifact.

9. The method of claim 8, wherein storing the association further comprises:
extracting the portion of chat history from a repository containing the portion of chat history; and
storing the portion of chat history with the version of the artifact.

10. The method of claim 9, wherein the portion of chat history is displayed adjacent to the version of the artifact within a graphical user interface (GUI).

11. The method of claim 7, wherein the set of features associated with the version of the artifact is identified based on a difference between the version of the artifact and another version of the artifact.

12. A computer program product comprising a computer readable storage medium having program instructions embodied therewith, the program instructions executable by a processor to cause the processor to perform a method comprising:
identifying a version of an artifact;
analyzing, by a natural language processor, the version of the artifact, wherein analyzing the version of the artifact comprises:
determining a set of features associated with the version of the artifact;
comparing the set of features associated with the version of the artifact to a portion of chat history;
calculating a match certainty based on a number of matching features between the set of features associated with the version of the artifact and the portion of chat history divided by a total number of features of the set of features associated with the version of the artifact;

determining, in response to the calculated match certainty satisfying a match certainty threshold, that the version of the artifact and portion of chat history correspond; and storing, in response to the determination that the version of the artifact corresponds to the portion of chat history, an association between the version of the artifact and the portion of chat history, wherein the association is stored as a hyperlink in a repository containing the version of the artifact, wherein activation of the hyperlink redirects a user to the portion of chat history.

13. The computer program product of claim 12, wherein storing the association further comprises:

extracting the portion of chat history from a chat history repository containing the portion of chat history; and storing the portion of chat history with the version of the artifact in the repository containing the artifact.

14. The computer program product of claim 13, wherein the stored portion of chat history is displayed adjacent to the version of the artifact within a graphical user interface (GUI).

15. The computer program product of claim 12, wherein the match certainty is based on a number of matching features between the version of the artifact and the portion of chat history.

* * * * *